(12) United States Patent
Kim

(10) Patent No.: US 6,774,516 B2
(45) Date of Patent: Aug. 10, 2004

(54) SEALING STRUCTURE FOR MOTOR USING KINETIC PRESSURE BEARING

(75) Inventor: Woon Ki Kim, Kyungki-Do (KR)

(73) Assignee: Samsung Electro-Mechanics Co., Ltd., Kyungki-do (KR)

( * ) Notice: Subject to any disclaimer, the term of this patent is extended or adjusted under 35 U.S.C. 154(b) by 0 days.

(21) Appl. No.: 10/401,929

(22) Filed: Mar. 28, 2003

(65) Prior Publication Data
US 2004/0032176 A1 Feb. 19, 2004

(30) Foreign Application Priority Data
Aug. 16, 2002 (KR) .................. 10-2002-0048446

(51) Int. Cl.[7] .................. H02K 11/00; H02K 7/00
(52) U.S. Cl. .................. 310/67 R; 310/90; 310/254
(58) Field of Search .................. 310/90, 67 R, 310/254; 384/114, 115

(56) References Cited

U.S. PATENT DOCUMENTS

| | | | | |
|---|---|---|---|---|
| 3,777,191 A | * | 12/1973 | Papst et al. | 310/67 R |
| 3,786,290 A | * | 1/1974 | Papst et al. | 310/90 |
| 3,845,339 A | * | 10/1974 | Merkle et al. | 310/156.34 |
| 4,798,480 A | * | 1/1989 | Van Beek | 384/114 |
| 4,938,611 A | * | 7/1990 | Nii et al. | 384/133 |
| 5,417,507 A | * | 5/1995 | Uno et al. | 384/107 |
| 5,647,672 A | * | 7/1997 | Fukutani | 384/100 |
| 5,677,585 A | * | 10/1997 | Ida et al. | 310/91 |
| 5,810,481 A | * | 9/1998 | Nii et al. | 384/279 |
| 5,834,870 A | * | 11/1998 | Tokushima et al. | 310/90 |
| 5,872,409 A | * | 2/1999 | Jung | 310/68 B |
| 5,994,803 A | * | 11/1999 | Jung | 310/51 |
| 6,005,312 A | * | 12/1999 | Yamane | 310/67 R |
| 6,023,114 A | * | 2/2000 | Mori et al. | 310/90 |
| 6,072,660 A | * | 6/2000 | Teshima | 360/99.08 |
| 6,357,920 B1 | * | 3/2002 | Mori et al. | 384/279 |
| 6,507,135 B1 | * | 1/2003 | Winkler | 310/91 |

* cited by examiner

Primary Examiner—Dang Le
Assistant Examiner—Heba Elkassabgi
(74) Attorney, Agent, or Firm—Darby & Darby

(57) ABSTRACT

Disclosed is a sealing structure for a motor using a kinetic pressure bearing, capable of improving productivity by reducing assembling time through modification in the sealing structure of the bearing, and of extending life of a motor, improving performance of a motor by more effectively preventing leakage of an oil in the interior of the bearing, to the outside.

7 Claims, 4 Drawing Sheets ns, there may exist a danger of incomplete hardening of the bending member due to mixture of the oil and the bending member upon heat fusion of the bending member. Additionally, due to such incomplete hardening, problems that adhesive force of the bending member is deteriorated and the oil in the interior of the bearing leaks out to the outside, or external air penetrates into the interior of the bearing, seriously spoiling the bearing, deteriorating performance of the motor, are generated.

SEALING STRUCTURE FOR MOTOR USING KINETIC PRESSURE BEARING

BACKGROUND OF THE INVENTION

1. Field of the Invention

The present invention relates to a motor using a kinetic pressure bearing, and more particularly to a sealing structure for a motor using a kinetic pressure bearing, capable of improving quality and productivity by more completely preventing an oil provided for kinetic pressure generation and lubrication, from leaking out.

2. Description of the Related Art

In general, a small precision motor currently used, adopts a fluid kinetic pressure bearing for generating kinetic pressure by torque due to rotation of a motor in the inside of a bearing so that a rotor floats above a stator and rotates, and for heat-resisting and abrasion-resisting properties.

FIG. 1 is a cross-sectional view of a motor using a kinetic pressure bearing of the related art, and FIG. 2 is an exploded, cross-sectional view of a sealing structure for a motor using a kinetic pressure bearing of the related art.

The motor of the related art, consists of: a cylinder shaped bearing 104 fixed on a base plate 102; a stator 106 fixed on the outer peripheral surface of the bearing 104, and to which power supply is applied; a magnet 108 arranged, with a constant interval, above the outer peripheral surface of the stator 106, for being rotated by interaction with the stator 106; a rotor 110 on which the magnet 108 is fixed and positioned on the upper side of the bearing; a shaft 112 inserted into the bearing 104 and fixed on the rotor 110 in its upper end, for supporting the rotor 110 so that the rotor is rotatable, and for generating kinetic pressure while being rotated in the interior of the bearing 104; a sealing unit 120 mounted on the lower end of the bearing, for preventing an oil provided to the interior of the bearing 104, from leaking out.

The sealing unit 120 is fixed on the lower end of the bearing 104 by caulking process, and consists of: a cover plate 114 having an air exhausting hole 116 for discharging an air of the interior of the bearing 104, to the outside; a bending member 118 adhered to the back side of the cover plate 114, for preventing leakage of an oil by sealing the air exhausting hole 116.

Assembling process for the sealing unit of the related art having the foregoing construction, will be descried with reference to FIG. 2.

A cover plate 114 is fit into the bearing 104 and fixed by caulking process. After sufficient amount of oil is provided to the interior of the bearing 104, a shaft 112 fixed on the rotor 110 is inserted into the interior of the bearing 104. At the moment, oil except the oil necessary for lubrication and kinetic pressure generation in the interior of the bearing 104, is exhausted together with the air in the interior of the bearing 104, to the outside through the air exhausting hole 116.

After that, the oil exhausted through the air exhausting hole 116 and stuck on the cover plate 114, is wiped away, and the bending member 118 is processed by heat fusion in order to seal the air exhausting hole 116, so that leakage of the oil in the interior of the bearing 104 to the outside, is prevented and at the same time, inflow of external air is prevented.

But, in the sealing structure for the motor using the kinetic pressure bearing of the related art as descried above, as the air exhausting hole remains exposed to the outside, there may exist a danger of incomplete hardening of the bending member due to mixture of the oil and the bending member upon heat fusion of the bending member. Additionally, due to such incomplete hardening, problems that adhesive force of the bending member is deteriorated and the oil in the interior of the bearing leaks out to the outside, or external air penetrates into the interior of the bearing, seriously spoiling the bearing, deteriorating performance of the motor, are generated.

Also, a problem that the bending member flows into the interior of the bearing through the air exhausting hole, upon heat fusion of the bending member, and is mixed with the oil, deteriorating lubrication performance, thereby shorting life of the motor due to abrasion, is generated.

SUMMARY OF THE INVENTION

To solve the above-indicated problems, it is, therefore, an object of the present invention to provide a sealing structure for a motor using a kinetic pressure bearing, capable of improving productivity through reduction in assembling time by modifying a sealing structure of a bearing, and of improving life and performance of a motor by more effectively preventing oil in the interior of the bearing from leaking out to the outside.

The foregoing and other objects and advantages are realized by providing a sealing structure for a motor using a kinetic pressure bearing including: a bearing fixed on a base plate; a stator arranged on an outer peripheral surface of the bearing; a rotor arranged, with constant interval, on an outer peripheral surface of the stator; a shaft inserted into the bearing, and fixed in the rotor; a cover plate fixed on a lower end of the bearing, and having an air exhausting hole for discharging an air in an interior of the bearing to an outside; a first plate fit into a back side of the cover plate, for sealing the air exhausting hole; a packing member stuck on a back side of the first plate, for preventing leakage of an oil; a second plate fixed on a back side of the packing member, for protecting the packing member.

It is a preferable aspect of the present invention that a sealing is fit between a back side of the bearing and the cover plate, for preventing oil from leaking out to a gap between the bearing and the cover plate.

It is another preferable aspect of the present invention that the cover plate has a fitting portion so that the first plate, the packing member and the second plate are sequentially fit, respectively, in a back side of a cylindrical shape.

It is yet another preferable aspect of the present invention that the fitting portion is of a cylindrical shape having a predetermined length and is fixed by heat fusion after the first plate, the packing member and the second plate are fitted.

It is another preferable aspect of the present invention that the cover plate is manufactured by metal or synthetic resin.

It is another preferable aspect of the present invention that the first and the second plates are manufactured in form of a cylindrical shape having a predetermined thickness and made of metal or synthetic member.

It is another preferable aspect of the present invention that the packing member is manufactured by rubber material having a predetermined elasticity.

BRIEF DESCRIPTION OF THE DRAWINGS

The above objects, features and advantages of the present invention will become more apparent from the following detailed description when taken in conjunction with the accompanying drawings, in which.

DETAILED DESCRIPTION OF THE PREFERRED EMBODIMENT

Figure 1:
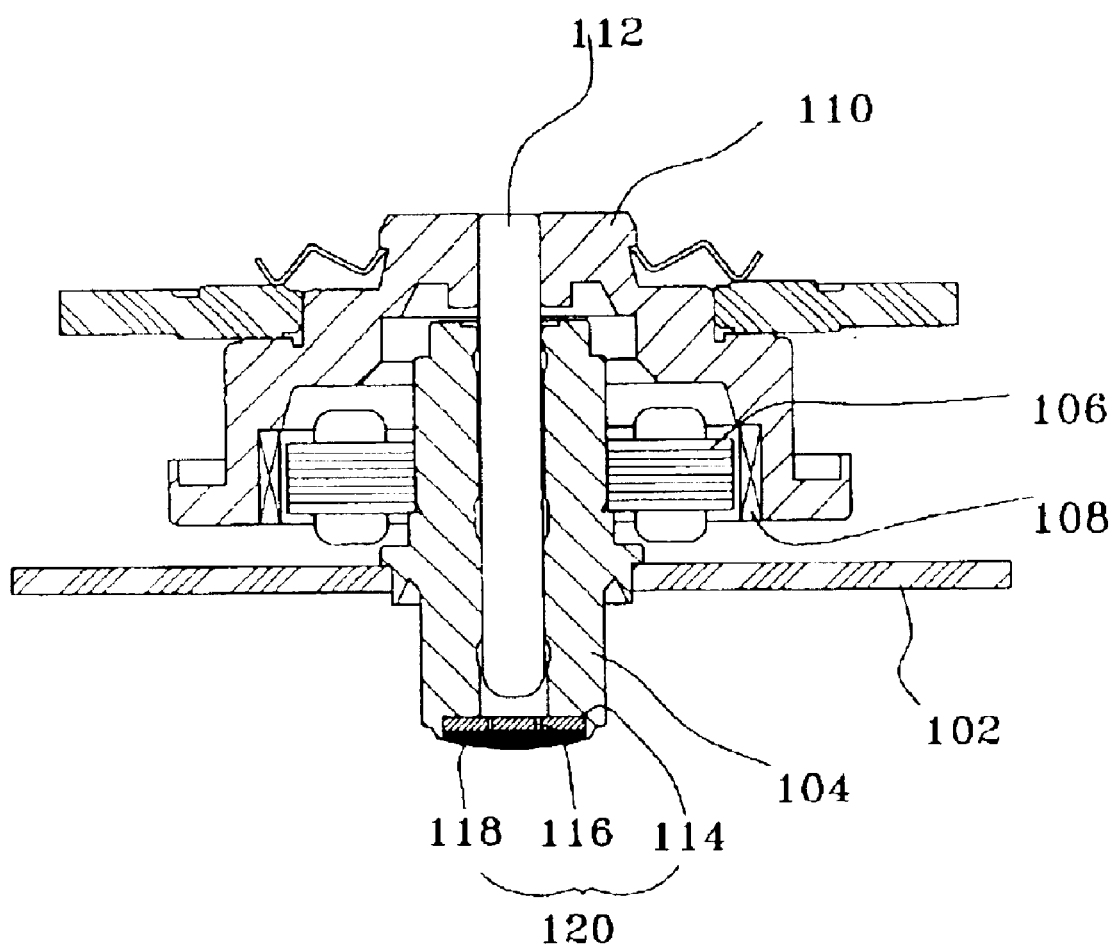
FIG. 1 is a cross-sectional view of a motor using a kinetic pressure bearing of the related art.
Figure 2:
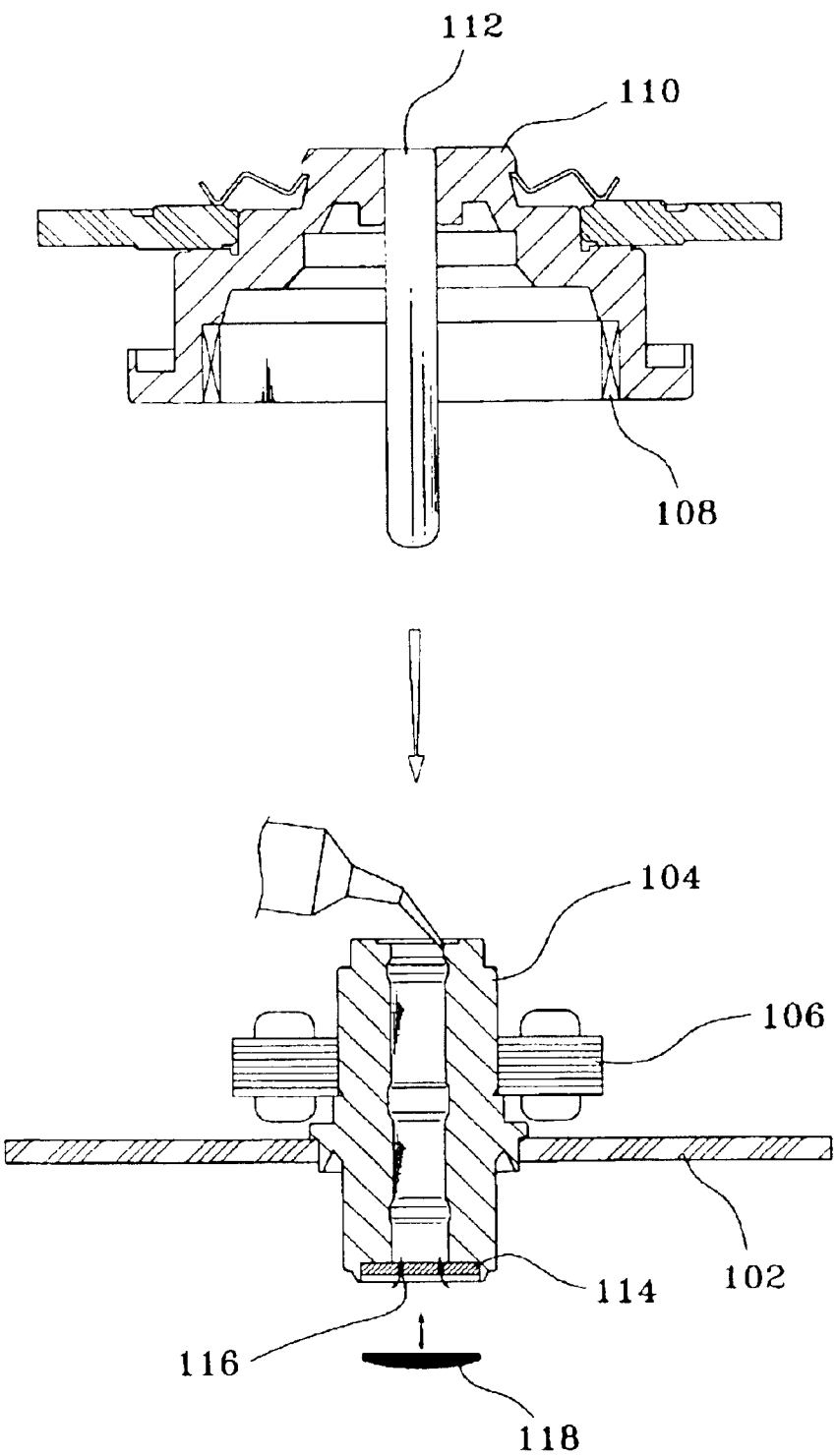
FIG. 2 is an exploded, cross-sectional view of a motor using a kinetic pressure bearing of the related art.

A preferred embodiment of the present invention will now be described with reference to the accompanying drawings. In the following description, same drawing reference numerals are used for the same elements even in different drawings. The matters defined in the description such as a detailed construction and elements of the invention are nothing but the ones provided to assist in a comprehensive understanding of the invention. Thus, it is apparent that the present invention can be carried out without those defined matters. Also, well-known functions or constructions are not described in detail since they would obscure the invention in unnecessary detail.

Figure 3:
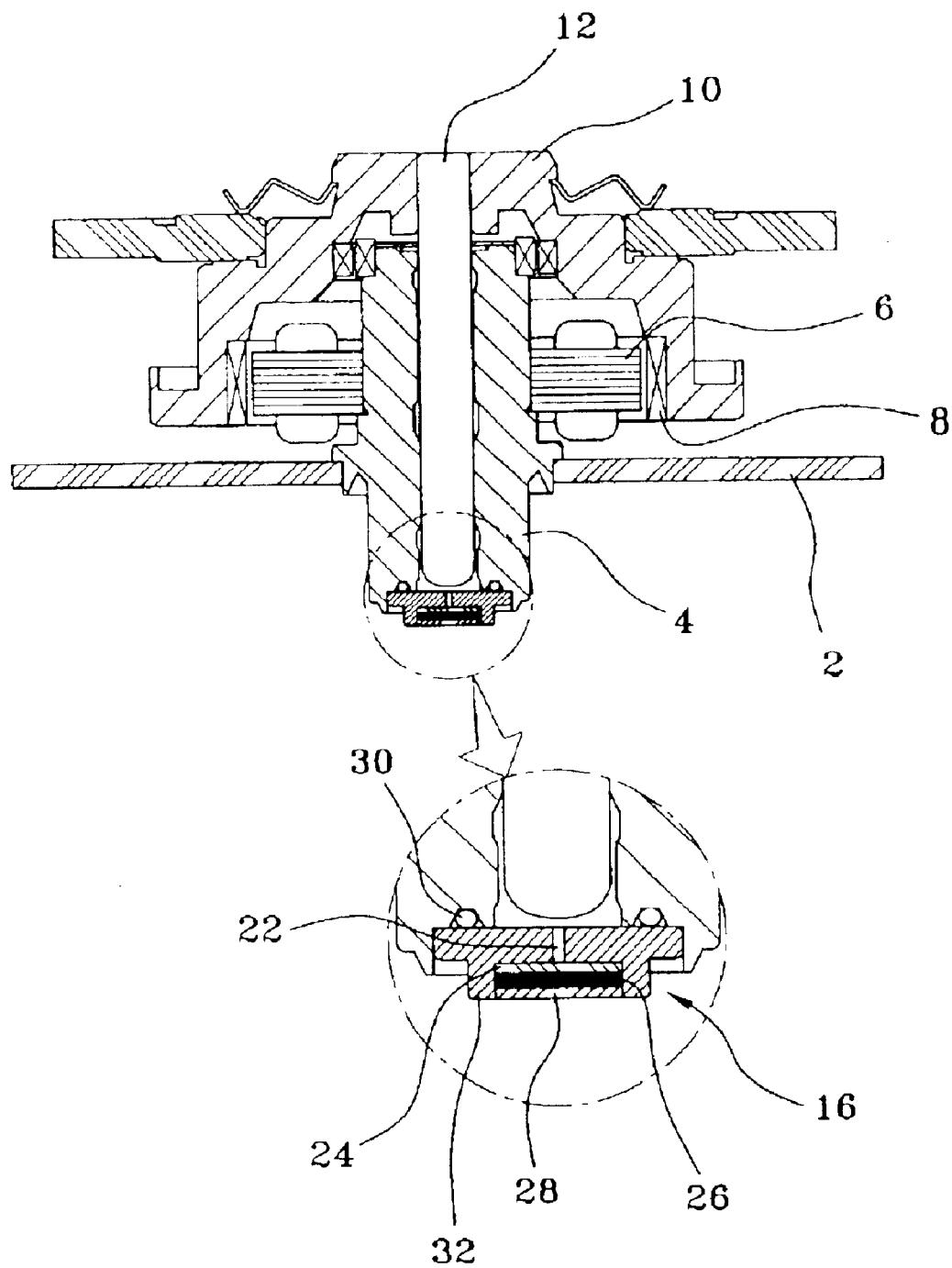
FIG. 3 is a cross-sectional view illustrating an oil sealing structure of a motor using a kinetic pressure bearing according to the present invention.

FIG. 3 is a cross-sectional view of a motor using a kinetic pressure bearing according to the present invention.

Referring to FIG. 3, the motor using a kinetic pressure bearing of the present invention includes: a cylinder shaped bearing 4 fixed on a base plate 2; a stator 6 fixed on the outer peripheral surface of the bearing 4; a magnet 8 arranged, with a constant interval, above the outer peripheral surface of the stator 6, for being rotated by interaction with the stator 6; a rotor 10 on which the magnet 8 is fixed and positioned on the upper side of the bearing, for being rotated together with the magnet 8; a shaft 12 inserted into the bearing 4 and fixed on the rotor 10 in its upper end, for supporting the rotor 10 so that the rotor is rotatable, and for generating kinetic pressure while being rotated in the interior of the bearing 4; a sealing unit 16 mounted on the lower end of the bearing, for preventing an oil supplied to the interior of the bearing 4, from leaking out.

Here, the oil supplied to the interior of the bearing 4 plays a role of making the rotor 10 rotated with being floated above by generating kinetic pressure, floating the shaft 12 upon rotation of the shaft 12, and at the same time, plays a role of performing lubrication and heat-resisting operations between the bearing 4 and the shaft 12.

The sealing unit 16 is fixed on the lower end of the bearing 4 by caulking process, and includes: a cover plate 20 having an air exhausting hole 22 for discharging an air in the interior of the bearing 4, to the outside; a first plate 24 fit into the back side of the cover plate 20, for sealing the air exhausting hole 22; a packing member 26 stuck on the back side of the first plate 24, for preventing an oil from leaking out to a gap between the first plate 24 and the cover plate 20; and a second plate 28 stuck on the back side of the packing member 26, for protecting the packing member 26.

Here, the bearing 4 has, in its back side, a groove 36 formed in the peripheral direction and a sealing 30 is fit into the groove 36, whereby leakage of an oil, to a gap between the cover plate 20 and the back side of the bearing 4, is prevented.

The cover plate 20 is manufactured by metal or plastics resin, and has a fitting portion 32 of a cylindrical shape so that the first plate 24, the packing member 26, and the second plate 28 are sequentially fit in its back side of a circular plate.

Also, the first and the second plates 24 and 28 are manufactured in form of circular plate having a predetermined thickness, and the packing member 26 is made of rubber material having a predetermined elasticity and is fit in the inner peripheral surface of the fitting portion 32 in the cover plate, so that leakage of the oil is prevented.

Figure 4:
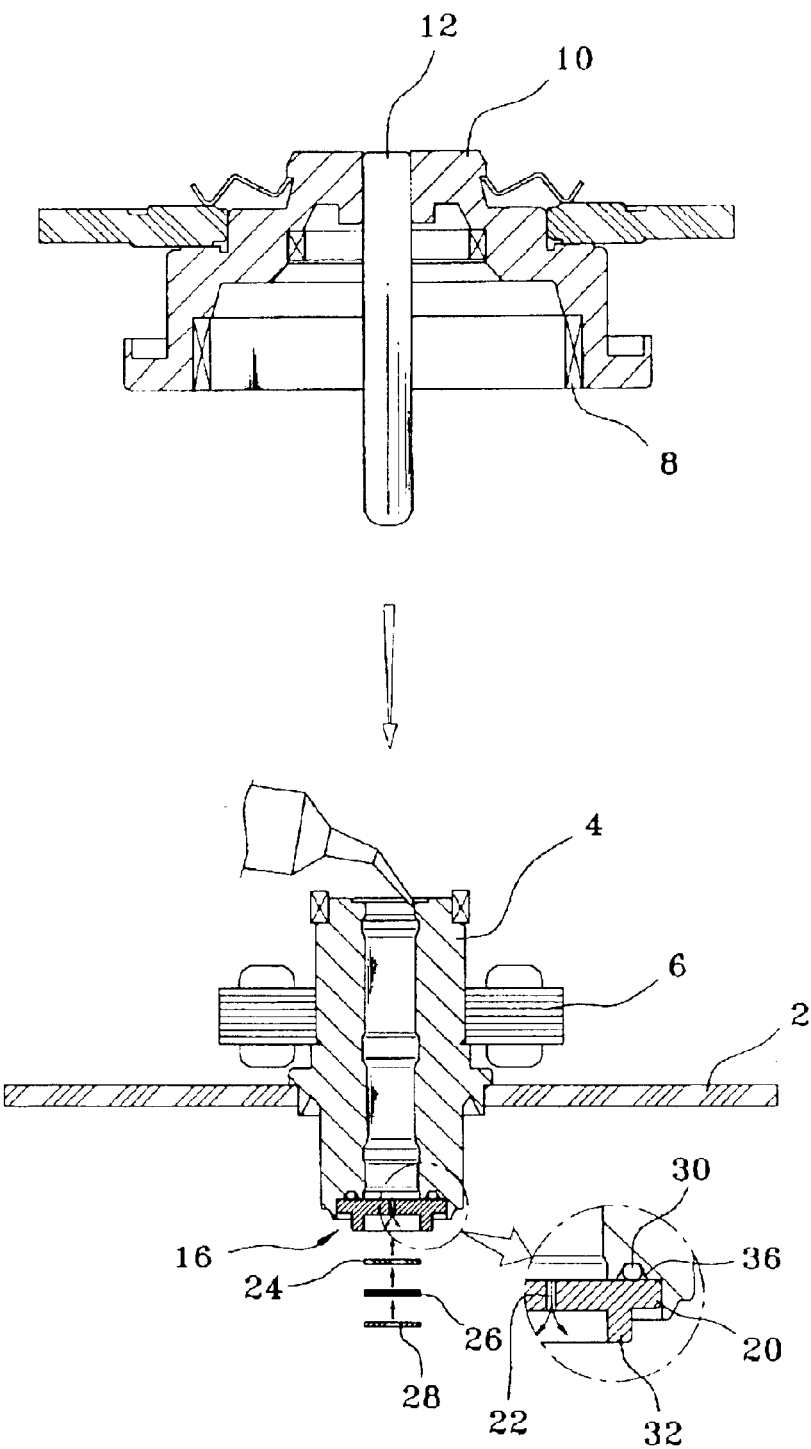
FIG. 4 is an exploded, cross-sectional view illustrating an oil sealing structure of a motor using a kinetic pressure bearing according to the present invention.

Assembling process for the sealing unit according to the present invention having the foregoing construction, will be described in detail with reference to FIG. 4.

The sealing 30 is fit into the groove 36 formed on the back side of the bearing 4. After that, the cover plate 20 is stuck on and fixed in the back side of the bearing 4 by caulking process or heat fusion, and sufficient amount of oil is supplied to the interior of the bearing 4. Additionally, the shaft 12 fixed on the rotor 10 is inserted into the interior of the bearing 4. At the moment, oil except the oil necessary for lubrication and kinetic pressure generation, is discharged together with air of the interior in the bearing 4, to the outside through the air exhausting hole 22 formed on the cover plate.

After that, the first plate 24 is fit into the fitting portion 32 of the cover plate, so that the air exhausting hole 22 is sealed, and the packing member 26 is fit in the inner peripheral surface of the fitting portion in a sealing manner, whereby leakage of the oil flowing into the gap between the first plate 24 and the cover plate 20 through the air exhausting hole 22, to the outside, is prevented.

Also, the second plate 28 is stuck on the back side of the packing member 26 and the outer peripheral surface of the cover plate 20 is processed by heat fusion, so that assembling process is completed.

Therefore, the sealing structure for the motor using the kinetic pressure bearing according to the present invention having the foregoing construction, has the first plate, the packing member, and the second plate sequentially fit in its back side of the cover plate, and then assembled in a manner of heat fusion, thereby effectively preventing the oil of the interior in the bearing, from leaking out and having strong points of improving reliability as well as extending life of the motor.

Additionally, as assembling process is completed when the first plate, the packing member and the second plate are sequentially fit in the back side of the cover plate, assembling time is possibly reduced, so that productivity is improved and production costs is lowered.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A motor using a kinetic pressure bearing, the motor comprising:

a bearing fixed on a base plate;

a stator arranged on an outer peripheral surface of the bearing;

a rotor arranged, with constant interval, on an outer peripheral surface of the stator;

a shaft inserted into the bearing, and fixed in the rotor;

a cover plate fixed on a lower end of the bearing, and having an air exhausting hole for discharging an air in an interior of the bearing to an outside;

a first plate fit into a back side of the cover plate, for sealing the air exhausting hole;

a packing member stuck on a back side of the first plate, for preventing leakage of an oil; and a second plate fixed on a back side of the packing member, for protecting the packing member.

2. The motor according to claim 1, wherein a sealing is fit between a back side of the bearing and the cover plate, for preventing oil from leaking out to a gap between the bearing and the cover plate.

3. The motor according to claim 1, wherein the cover plate has, in its cylinder shaped back side, a fitting portion so that the first plate, the packing member and the second plate are sequentially fit, respectively.

4. The motor according to claim 3, wherein the fitting portion is of a cylindrical shape having a predetermined length and is fixed by heat fusion after the first plate, the packing member and the second plate are fit.

5. The motor according to claim 3, wherein the cover plate is manufactured by metal or synthetic resin.

6. The motor according to claim 1, wherein the first and the second plates are manufactured in form of a cylindrical shape having a predetermined thickness and made of metal or synthetic member.

7. The motor according to claim 1, wherein the packing member is manufactured by rubber material having-a predetermined elasticity.

* * * * *